United States Patent [19]

Moran et al.

[11] Patent Number: 4,511,842
[45] Date of Patent: Apr. 16, 1985

[54] ELECTROMAGNETIC LOGGING DEVICE AND METHOD WITH DIELECTRIC GUIDING LAYER

[75] Inventors: James H. Moran, Spicewood; Rama N. Rau, League City, both of Tex.

[73] Assignee: Schlumberger Technology Corporation, New York, N.Y.

[21] Appl. No.: 310,691

[22] Filed: Oct. 13, 1981

[51] Int. Cl.³ .......................... G01V 3/18; G01V 3/30
[52] U.S. Cl. .................................................... 324/338
[58] Field of Search ................ 324/337, 338, 339, 340

[56] References Cited

U.S. PATENT DOCUMENTS 3,775,765  11/1973  DiPiazza et al. .................... 324/337
3,944,910   3/1976  Rau ..................................... 324/338

OTHER PUBLICATIONS

Birchek, et al., "High Dielectric Constant Microwave Probes for Sensing Soil Moisture" Proceedings of the IEEE, vol. 62, No. 1, Jan. 1974, pp. 93–98.
Hipp, "Soil Electromagnetic . . . Soil Moisture" Proceedings of the IEEE, vol. 62, No. 1, 1/1974, pp. 98–102.
Castle et al., "A Microwave Instrument . . . Water Content of Crude Oil" Proceedings of the IEEE, vol. 62, No. 1, pp. 103–108, 1/1974.
Collin, "Foundations for Microwave Engineering" 1966, McGraw-Hill Inc., pp. 113–121.
Freedman et al., "Theory of Microwave . . . Propagation Method" Geophysics, vol.–No. 5, May 1979, pp. 969–986.

Primary Examiner—Gerard R. Strecker
Assistant Examiner—Walter E. Snow
Attorney, Agent, or Firm—David Carroll; Martin Novack

[57]  ABSTRACT

An improvement in signal level reception of an electromagnetic pad-type device in relatively conductive formations can be achieved by providing a layer of dielectric material that abuts the borehole wall and serves to enhance injection into the formations and guiding of the electromagnetic energy.

7 Claims, 10 Drawing Figures

//4,511,842

ELECTROMAGNETIC LOGGING DEVICE AND METHOD WITH DIELECTRIC GUIDING LAYER

DESCRIPTION

1. Technical Field

This invention relates to the investigation of subsurface formations surrounding a borehole and, more particularly, to improvements in logging techniques for determining formation properties, such as dielectric constant and/or conductivity, by measuring the characteristics of electromagnetic energy which has been passed through the formations.

2. Background Art

There are numerous methods and devices disclosed in the prior art for measuring the conductivity of subsurface formations, and also for measuring the dielectric constant thereof. Conductivity measurement in an earth borehole is very old and well established in the art. Regarding measurement of dielectric constant (or electric permittivity), prior investigators recognized that the relative dielectric constant of the different materials of earth formations vary widely (e.g. 2.2 for oil, 7.5 for limestone, and 80 for water) and that the measurement of dielectric properties therefore holds promise of being a useful means of formation evaluation. Since hydrocarbon saturated formations and fresh water saturated formations can both have very high resistivity, the contrast between the dielectric constant of hydrocarbons and water is especially meaningful in situations where low salinity is encountered. However, until recently, devices for measuring dielectric constant in a borehole did not achieve significant commercial acceptance.

There was recently developed a logging device which investigates earth formations surrounding a borehole by radiating microwave electromagnetic energy into the formations and then taking measurements which relate to the propagation of the energy in the formations. A form of this device, known as an "electromagnetic propagation tool" (or "EPT"), is disclosed in the U.S. Pat. No. 3,944,910. In operation of the EPT logging device, the relative phase of energy received at a spaced receiver pair is measured and used to obtain indications of the formation dielectric constant, typically in the so-called invaded zone of the formations which are nearest the borehole. The wave attenuation may also be measured at the receivers and used to implement corrections to the EPT phase measurements since the lossiness of the propagation medium can affect travel time therethrough. In addition to measurement of dielectric constant, the EPT is useful in determining other properties of the formation invaded zone, such as conductivity or bound water content.

One form of EPT logging device employs a transmitting antenna and spaced receiving antennas which are mounted in a pad that is adapted to abut the borehole wall. The antennas are slot antennas which face the borehole wall broadside in a manner which facilitates transmission of energy beyond the mudcake and into the formations. The antennas are spaced relatively closely together with, for example, the distance from the transmitter to the near receiver being of the order of 10 centimeters and the distance between receivers being about half of the transmitter-to-near receiver distance. The main reason that relatively short spacings are employed is the rapid attenuation of signals which results from the use of microwave operating frequencies. Even at these relatively short spacings, the level of the received signals can become undesirably low in some formations, with concomitant decrease in signal-to-noise ratio. For example, in relatively conductive formations, e.g. formations having a resistivity of 2 ohm-meters or less, performance can be degraded by the low amplitude of received signals.

It is an object of the present invention to set forth a logging apparatus and method which exhibits improved performance in measuring the properties of electromagnetic energy propagating through formations that are relatively conductive. It is also an object of the present invention to provide a pad-type logging apparatus that can be used in such formations at frequencies below the microwave range and with spacings that are longer than those of a microwave logging apparatus, as well as to provide improved operation in a microwave logging apparatus.

DISCLOSURE OF INVENTION

Applicants have discovered that a substantial improvement in signal level reception of an electromagnetic pad-type device in relatively conductive formations can be achieved by providing a layer of dielectric material that abuts the borehole wall and serves to enhance injection into the formations and guiding of the electromagnetic energy. In accordance with a form of the invention, there is provided a logging device and method for determining properties of formations surrounding a borehole. In the device, a transmitter and a receiver are mounted in spaced relation in a wall-engagable member. A layer of dielectric material is disposed on a surface of the member and covers the region of the transmitter and receiver, such that the layer can abut the wall of the borehole. The layer of dielectric material preferably has a dielectric constant which is greater than the expected dielectric constant of the formations to be investigated. A source of electromagnetic energy is coupled to the transmitter. Means are provided for measuring characteristics of electromagnetic energy received at the receiver to determine properties of the surrounding formations.

The dielectric layer or slab is preferably thin, since the thinner the slab, the deeper will be the effective depth of investigation of the device into the formation invaded zone beyond the mudcake. However, the layer of dielectric material should be thick enough to provide the desired guiding action and should also be thick enough to provide necessary ruggedness. The transmitter can advantageously be oriented so as to preferentially direct electromagnetic energy into the layer of dielectric material in the direction of the receiver. The usual considerations of critical angle necessary for getting energy into the formations are less restrictive since, in the present invention, energy is initially directed primarily into the dielectric layer.

In one form of the invention the wall engaging member is a single pad and the dielectric layer covers the transmitter, the receivers, and the area therebetween. In another form of the invention, the transmitter is mounted on a borehole wall-engaging pad that is separate from the wall-engaging pad or pads used for mounting the receivers. This tends to reduce direct coupling and also, where longer transmitter-to-receiver spacings are employed, reduces a possible disadvantage of poor overall contact with the borehole wall that can occur when using an inordinately long pad. In an embodiment of this form of the invention, each transmitter and receiver pad includes a layer of dielectric material disposed over a transmitting or receiving element, which may be a microstrip type of launcher or receiver.

To obtain an initial understanding of operation of the invention, consider the formation invaded zone, the borehole mudcake adjacent thereto, and a thin dielectric slab adjacent to the borehole mudcake. If these three entities are considered together as a transmission medium, the dielectric slab can be seen to provide a guiding influence on energy propagating in the (more conductive) formation invaded zone. Actually, the electromagnetic energy will prefer to propagate in the lower loss medium of the dielectric slab. Due to the boundary conditions of wave propagation, however, the energy propagating in the relatively low loss dielectric slab will be largely controlled or "modulated" by the energy propagating in the formation invaded zone. Therefore, measurement of the energy received at the device receiver can be utilized to obtain desired information concerning the wave propagation properties of the formation invaded zone.

The present invention is advantageous in taking measurements in situations wherein the amount of signal actually propagating through the formations to be measured is limited. In general, an EPT type of device, or any pad-type electromagnetic measurement device, would be expected to have limited effectiveness in boreholes drilled with water-based muds since a substantial portion of the transmitted signal will tend to propagate in the mudcake. Using the described form of the present invention, the amount of signal which must actually propagate through the formations (or invaded zone), for a given quality of measurement, is less than in the prior art. Accordingly, the invention renders more practical the use of certain logging devices in situations where a water-based mud has been used.

Further features and advantages of the invention will become more readily apparent from the following detailed description when taken in conjunction with the accompanying drawings.

BEST MODE FOR CARRYING OUT THE INVENTION

Figure 1:
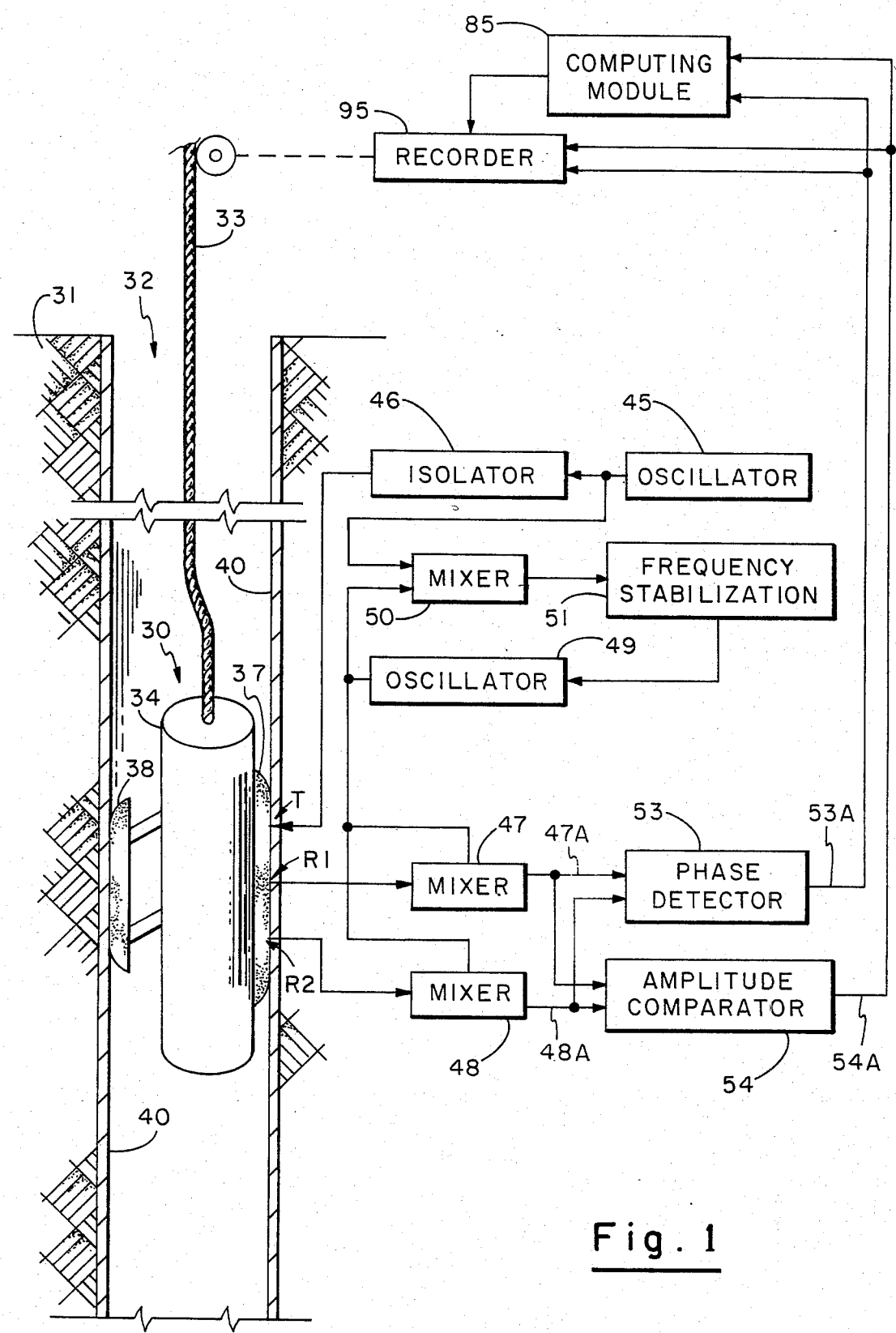
FIG. 1 is a schematic representation, partially in block diagram form, of an embodiment of the invention.

Referring to FIG. 1, there is shown a representative embodiment of an apparatus 30 in accordance with a first form of the present invention for investigating subsurface formations 31 traversed by a borehole 32. The borehole 32 is typically filled with a drilling fluid or mud which contains finally divided solids in suspension. Generally, the fluid pressure in the formations traversed by the borehole is less than the hydrostatic pressure of the column of mud in the borehole, so that the mud and mud filtrate flow somewhat into the formations. As is well known, the formations tend to screen the small particles suspended in the mud so that a mudcake 40 is formed on the walls of the borehole.

The investigating apparatus or logging device 30 is suspended in the borehole 32 on an armored cable 33, the length of which substantially determines the relative depth of the device 30. The cable length is controlled by suitable means at the surface such as a drum and winch mechanism (not shown). The logging device 30 includes an elongated cylindrical support member 34, the interior portion of which has a fluid-tight housing containing the bulk of the downhole electronics. Mounted on one side of support member 34 is a pad 37 which contains, inter alia, transmitting antenna T and vertically spaced receiving antennas $R_1$ and $R_2$. On the other side of support member 34 is mounted a backup arm 38 which may be hydraulically controlled to maintain the pad 37 in contact with the borehole wall. The backup arm 38 can also be used to provide a caliper reading. Electronic signals indicative of the information obtained by the logging device are transmitted through the cable 32 to a computing module 85 and a recorder 95, located at the surface of the earth. The particular means shown in FIG. 1 for maintaining the antennas in engagement with the borehole wall is illustrative, and it will be appreciated that other known suitable means for accomplishing this objective can be utilized.

The downhole electronics contained within the member 34 are shown, for convenience of illustration, at the side of the borehole. An oscillator 45 provides output energy which, in the present invention, may be in the range of frequencies between about 3 MHz. and 3 GHz. The output of oscillator 45 is coupled through an isolator 46 to the transmitting antenna T. Electromagnetic energy is transmitted into the surrounding formations. Energy received at receiving antennas $R_1$ and $R_2$ is respectively coupled to input terminals of mixers 47 and 48. As described, for example, in the U.S. Pat. No. 3,944,910, the signals which arrive from $R_1$ and $R_2$ are out of phase with each other by an amount which depends upon properties of the surrounding formations and have an amplitude ratio which also depends upon properties of the surrounding formations. Secondary input terminals of the mixers are supplied with energy at a frequency that is separated from the transmitter frequency by some relatively low frequency which is typically in the kilohertz frequency range. In the embodiment shown, oscillator 49 supplies electromagnetic energy to mixers 47 and 48 at a frequency that is, for example, 10 KHz. above the transmitter frequency. The output signals 47A and 48A of the mixers 47 and 48 therefore contain the difference frequency of 10 KHz. In accordance with well known principles, the signals 47A and 48A maintain the phase and amplitude relationships of the signals from $R_1$ and $R_2$, but the task of phase detection is greatly facilitated at the lower frequency of the mixed signals. To insure that the difference frequency between the outputs of the oscillators 45 and 49 remains at 10 KHz., the oscillator outputs are sampled and fed to a mixer 50. The output of the mixer is received by a frequency stabilization circuit 51 which detects drifts from the 10 KHz. standard and generates a correction signal 51A which controls oscillator 49 in the manner of a conventional "phase-locked loop".

The signals 47A and 48A are applied to a phase detector circuit 53 and to an amplitude comparator 54. The output of the phase detector 53 is a signal level which is proportional to the phase difference $\phi$ between the signals received at $R_2$ and $R_1$. The output of amplitude comparator 54 is a signal level which is proportional to the relative amplitude of the signal received at $R_2$ with respect to the signal received at $R_1$. A suitable amplitude comparator circuit is disclosed, for example, in the above-referenced U.S. Pat. No. 3,944,910.

The outputs of the phase detector circuit 53 and the amplitude comparison circuit 54 are transmitted to the surface over the conductor pair 53A and 54A which in actuality pass through the armored cable 33. Typically, these signals are D.C. levels which are stepped-up by amplification before transmission to the surface.

At the surface of the earth the signals on lines 53A and 54A are recorded by a recorder 95 that is conventionally driven as a function of borehole depth by mechanical coupling to a rotating wheel 96. The wheel 96 is coupled to the cable 33 and rotates in synchronism therewith so as to move as a function of borehole depth. In addition to recording the attenuation and phase representative signals on recorder 95, these signals may also typically be coupled to a computing module 85. The computing module may include processing means for determining the dielectric constant and/or the conductivity of the invaded zone of the surrounding formations. The recording means may alternately include processing means for determining other parameters of the surrounding formations, as is known in the art. It will be understood that the present invention is directed to improvements in the structure of the logging device, and is not limited by the manner in which detected signals are processed. In this same context it will be recognized that while differential measurements of phase attenuation are set forth in the described embodiments of FIG. 1, absolute measurements of phase and/or amplitude relative to the transmitter may be taken and utilized, if desired. These measurements can also be useful in a determination of mudcake resistivity and thickness.

Figure 2:
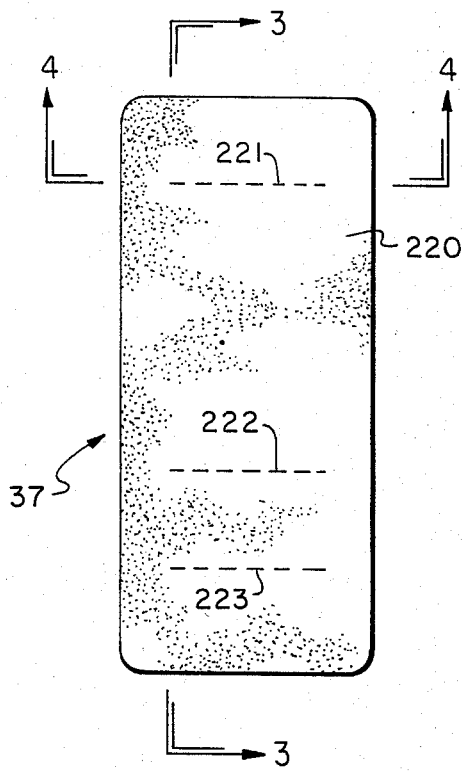
FIGS. 2-4 illustrate a pad member in accordance with an embodiment of the invention, FIG. 2 showing the pad front face, FIG. 3 being a cross-section taken through the region defined by arrows 3—3 of FIG. 2, and FIG. 4 being a cross-section taken through the region defined by arrows 4—4 of FIG. 2.
Figure 3:
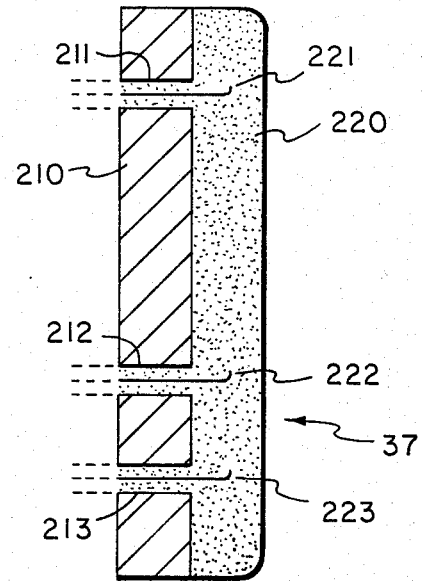
Figure 4:
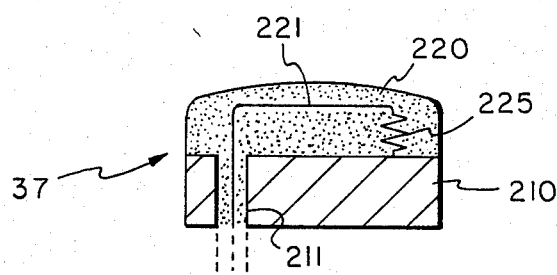

FIGS. 2-4 illustrate a form of the pad 37 (FIG. 1) in accordance with an embodiment of the invention. Pad 37 includes a support member 210 which, in the present embodiment, is formed of a conductive metal and also serves as a ground plane. A layer 220 of dielectric material is disposed on support member 210 and, in the present embodiment, comprises the surface of the device that abuts the borehole wall. It will be understood that appropriate strengthening structures can be employed. The support member 210 includes fittings 211, 212 and 213 which are adapted to receive coaxial cable connections that are coupled to the circuits 46, 47 and 48. In each coaxial line is used to form a loop antenna. The loop antenna 221 corresponds to the transmitter T of FIG. 1, and the loop antennas 222 and 223 respectively correspond to the receivers $R_1$ and $R_2$ of the differential receiver arrangement of FIG. 1. Each of the loop antennas is terminated in the ground plane via a resistive load 225, as seen in FIG. 4.

The dielectric material 220 should have a dielectric constant that is greater than the expected dielectric constant of the formations to be logged. As long as this condition is met, there is some flexibility regarding the dielectric constant of the layer 220. High dielectric constant material (which results in a shorter wavelength in the dielectric material at a given frequency of operation) is preferred for operation at lower frequencies, at which longer transmitter/receiver spacings are employed. Longer spacing results in the device having a greater depth of investigation. A high dielectric constant material may be, for example, "TAM TICON BS" which is 79% barium and 21% strontium titanate, and has a very high dielectric constant of about 8000. The thickness of dielectric layer 220 is preferably at least about one-tenth of a wavelength in the dielectric material at the operating frequency.

Figure 5:
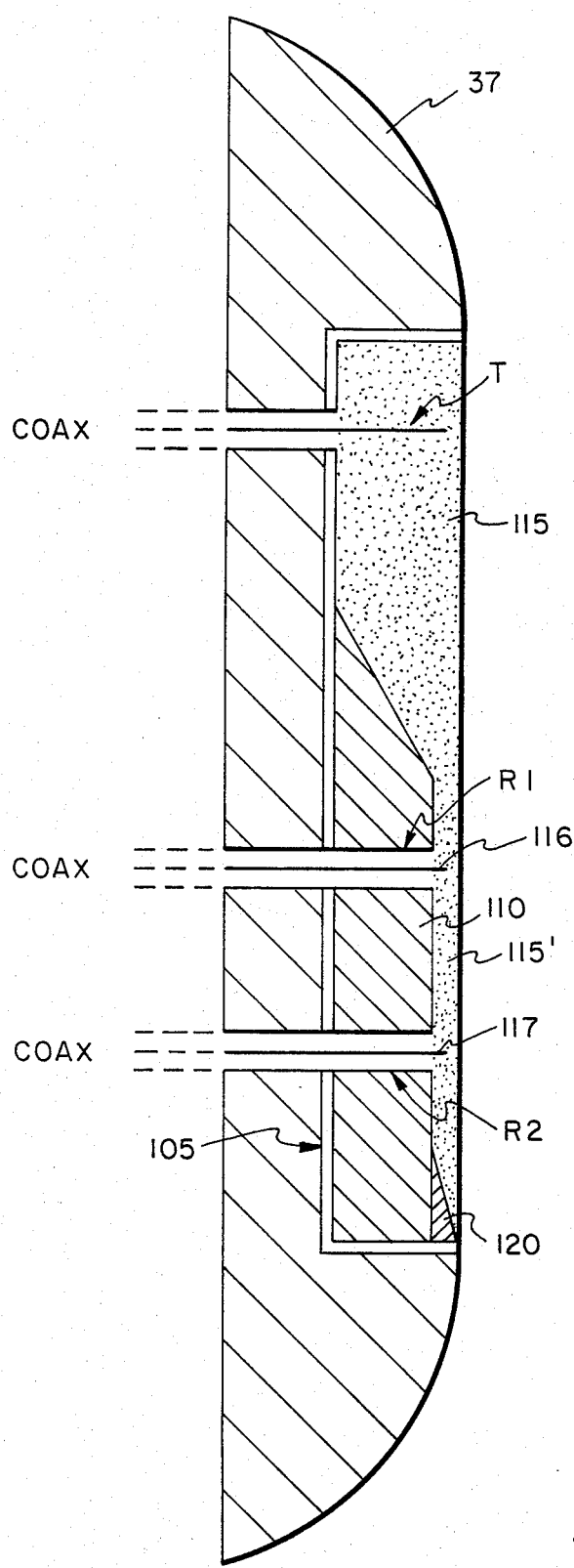
FIG. 5 is a cross-sectional view through a pad in accordance with another embodiment of the invention.

Referring to FIG. 5 there is shown a cross-sectional view of a form of the pad 37 (FIG. 1) in accordance with another embodiment of the invention. A generally rectangular metal receptacle 105 having one open face (the right face in FIG. 5) is disposed in the pad 37 and has a wedge-shaped metal member 110 seated therein. In the present embodiment, the dimension of the thickness portion of wedge-shaped member 110 is slightly less than the depth of receptacle 105. Thus, when the receptacle 105 is filled with a dielectric material 115, a small strip or slab 115' of dielectric material is disposed over the thickest portion of the member 110. A pair of receiving antennas, corresponding to receivers $R_1$ and $R_2$ of FIG. 1 are formed in the pad 37 by providing dielectric-filled openings in the metal member 110 which are aligned with corresponding openings in the receptacle 105 and have central probe elements 116 and 117, respectively. The transmitting antenna, corresponding to T in FIG. 1, is formed at another opening in receptacle 105 and includes radiating probe element 119. The openings in receptacle 105 may be provided with suitable threading or other means for attachment of coaxial lines which are shown in dashed line in FIG. 5, the central conductor of the coaxial lines extending to form the probes 116, 117 and 119, as illustrated in the FIGURE. The width of the antenna openings are preferably about a half wavelength at the energizing frequency. The portion of device 30 around antenna T serves as the beginning of a waveguide and the tapered central portion provides a gradual transformation of impedance between the waveguide and the slab 115'. The spacing between the transmitter probe and the end wall of receptacle 105 is selected as being an odd multiple of quarter wavelengths so that the transmitter is effectively oriented to preferentially direct the microwave energy in the direction of the receivers. A tapered wave absorber 120, typically formed of a lossy ferrite material, is provided at the end of the slab 115'. Since there are substantially no reflections from this absorber, the slab may be considered as behaving as though it were substantially infinite beyond the receivers.

Figure 6:
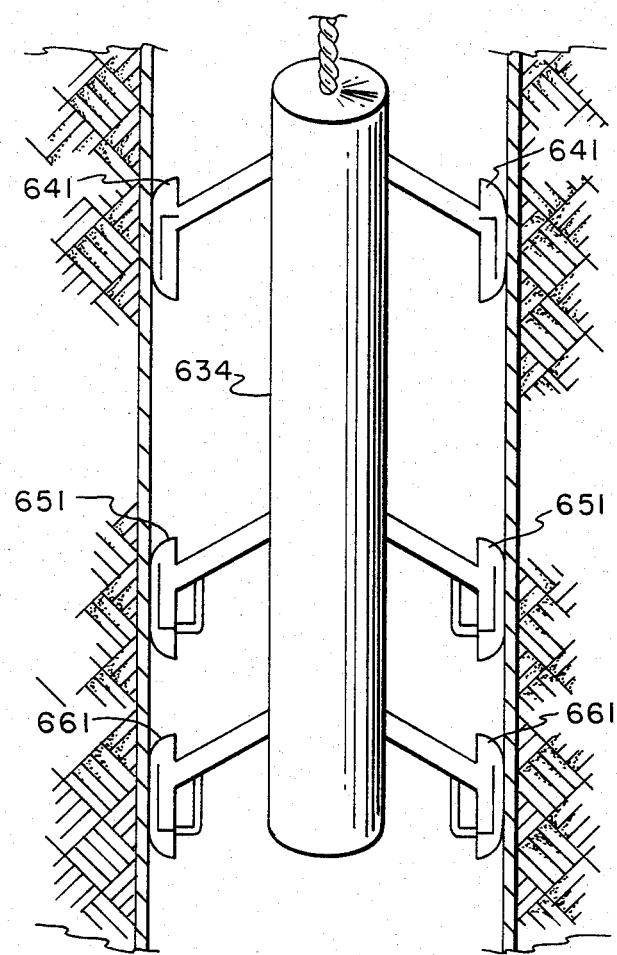
FIG. 6 is a vertical cross-section through a logging device in accordance with another embodiment of the invention.
Figure 7:
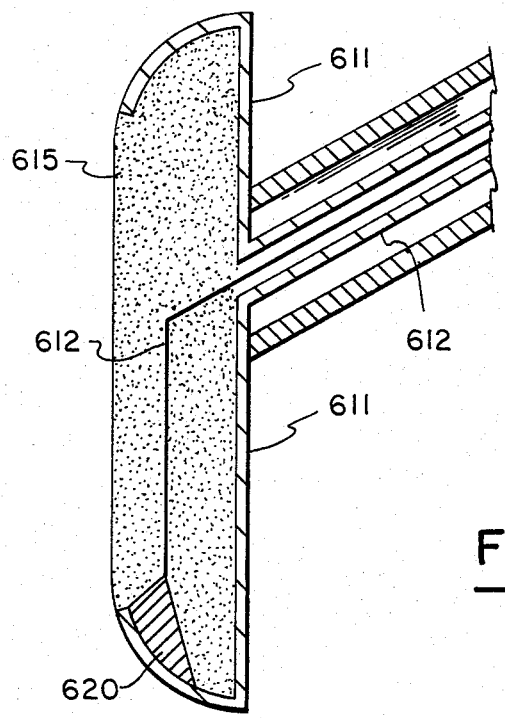
FIG. 7 illustrates in further detail an individual pad of the embodiment of FIG. 7.

In the previously described embodiments a single pad structure is illustrated but, if desired, multiple pads can be employed, with, for example, one or more pads for the transmitter and for the receiver pair or for each individual receiver. Separate pads will have particular application for longer spacing (and lower frequency) operation where a long pad may not provide adequate contact with the borehole wall. In the embodiment of FIG. 6 it is assumed that other than the downhole logging device shown in the FIGURE, the circuitry is essentially as illustrated in FIG. 1. In this embodiment sonde 634 (which typically has a fluid-tight housing containing the bulk of the downhole electronics), has wall-engaging transmitter pads 641, wall-engaging "close" receiver pads 651, and wall-engaging "far" receiver pads 661. Each of the pads is mechanically connected to the sonde by a flexibly mounted support arm, as known in the art. As seen in FIG. 7 each pad includes a supportive metal base 611 that also serves as a ground plane and shield, and is coupled to the outer conductor of coaxial line 612 that is coupled, in turn, to the pad through the support arm (or, as illustrated in the case of the receiver pads of FIG. 6, through a separate feed line). In the case of the transmitter pads, the coaxial lines couple electromagnetic energy from isolator 46 (FIG. 1) via a power divider (not shown). In the case of the receiver pads the coaxial lines couple received electromagnetic energy to mixers 47 and 48 (FIG. 1), respectively, for the near and far receiver pads, the two near receiver outputs being added together and the two far receiver outputs also being added together. (If desired, independent or sequenced operation can be implemented on different sides of the borehole. However, an advantage of the parallel operation is the establishment of more uniform continuous wave energy around the borehole.) The center conductor of each coaxial line is coupled to a microstrip element 612 (used as a wave launcher in the transmitter pads and a wave receiver element in the receiver pads) comprises an elongated metal strip embedded in a dielectric material 615 that forms the remainder of the body of each pad. A portion of the dielectric material 615 covers the surface of the microstrip element 612 and comprises a guiding layer that abuts the wall of the borehole. The length of the metal strip of element 612 preferably has a length that is at least one-tenth of the wave length in the dielectric at the lowest frequency of operation of the device. The end of the metal strip is terminated in a tapered wave absorber 620. The transmitter and receiver pads may all be of similar construction, the main difference being that the microstrip elements of the receivers are oriented to face the transmitters so as to preferentially receive energy from the transmitter direction. Considerations of the dielectric constant of the dielectric material are as described above in conjunction with the prior embodiments.

Figure 8:
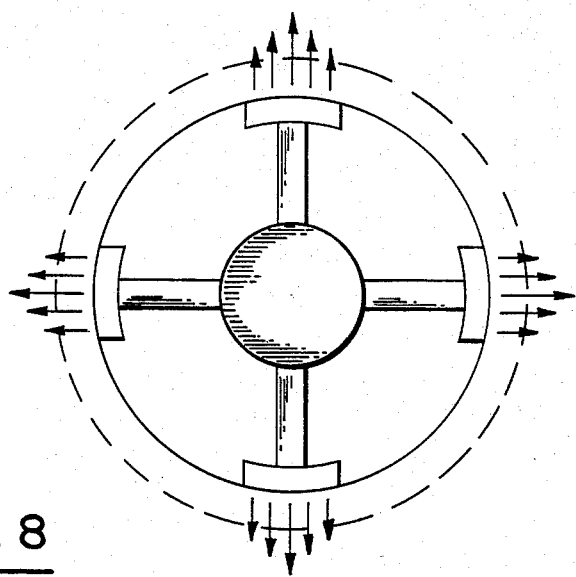
FIG. 8 is a horizontal cross-section through the transmitter pads of a form of the FIG. 6 embodiment.

FIG. 8 shows a cross-sectional view through the transmitter pads of FIG. 6, and illustrates a configuration wherein four transmitter pads are employed. Typical electric (arrows) and magnetic (dashed lines) field lines are also shown in this FIGURE.

Figure 9:
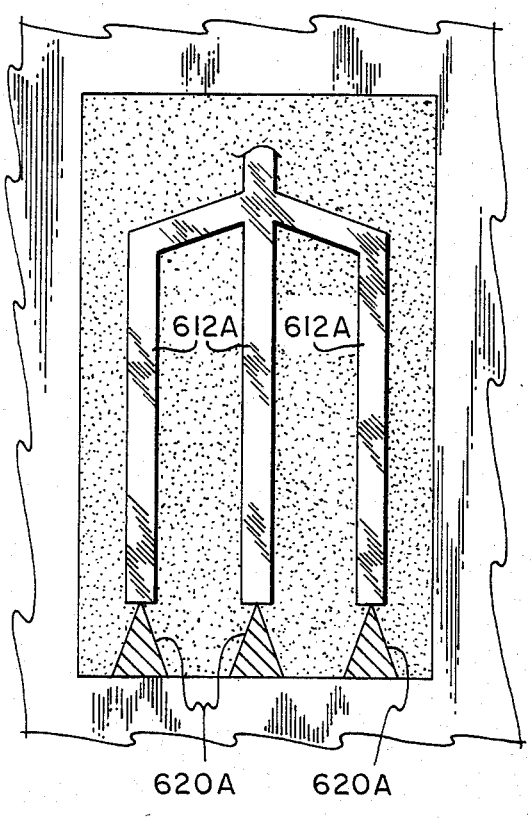
FIG. 9 is a front view of a portion of another form of pad of the FIG. 6 embodiment.

FIG. 9 shows a front view of a portion of a pad of FIG. 6 wherein the microstrip element 612 includes multiple parallel elements 612A, each with their own termination 620A, this configuration being used to obtain a wider electromagnetic wave energy pattern.

Operation of the logging device of the present invention is based in part on surface wave propagation that has the characteristic of a longitudinal propagation constant in a medium of higher dielectric constant which is a function of the propagation constant of a lower dielectric constant medium adjacent to it. By choosing the dielectric constant of the device's dielectric surface layer greater than the dielectric constant of the formation, one can determine formation dielectric properties by measuring the longitudinal propagation constant in the dielectric layer. The invention is founded on the structure defined by the claims below, and not upon the precise mathematics involved in evaluating any particular simplified model thereof in conjunction with a formation model. However, the following analysis of a simplified model is useful in further understanding the principles of the invention.

Figure 10:
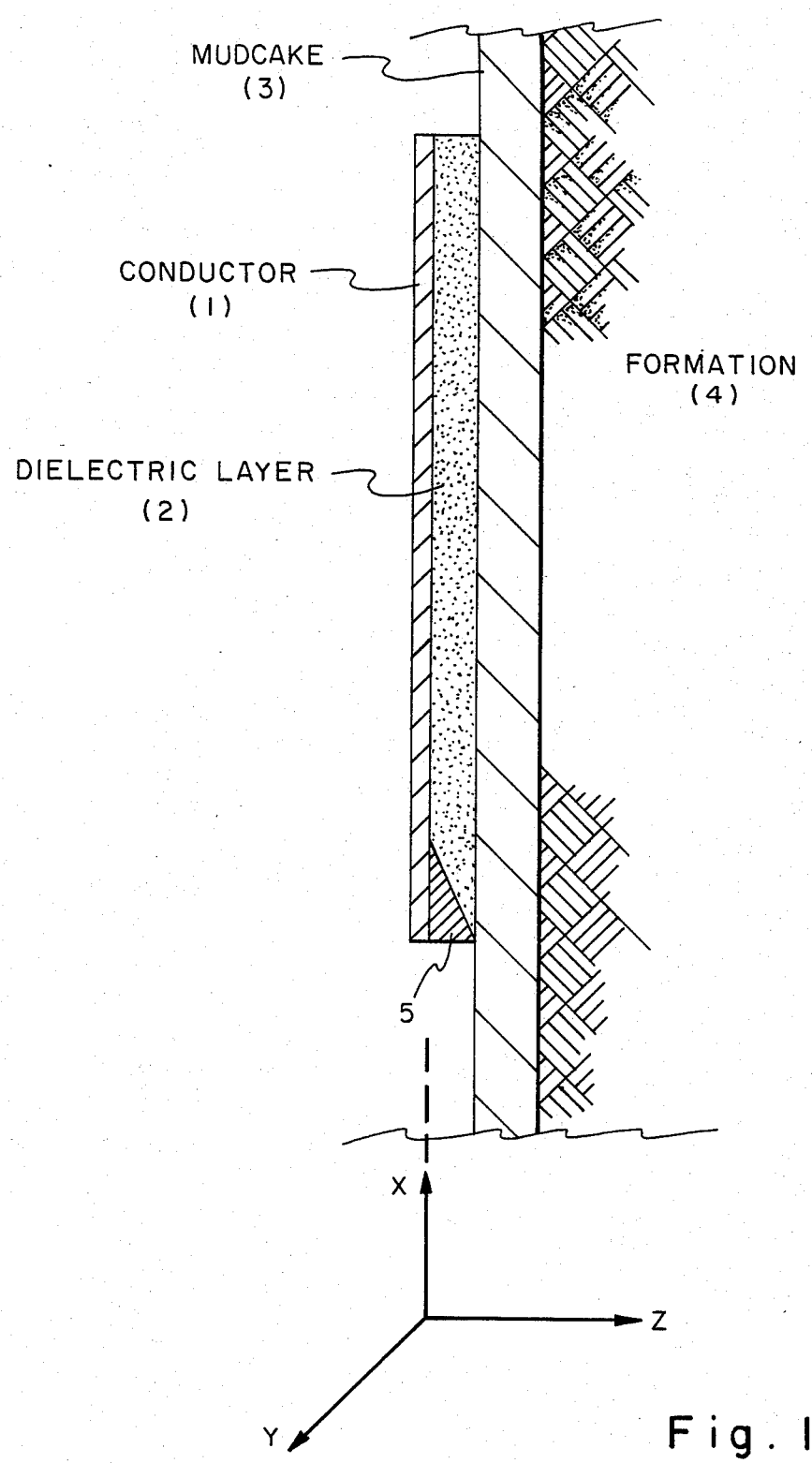
FIG. 10 is a simplified model that is useful in understanding operation of an embodiment of the invention.

Consider the FIG. 10 simplified model of the embodiments of FIGS. 2-5. Assume that the formation 4 is of infinite extent and has a complex dielectric constant $\epsilon_4^*$. A metal conductor 1 has disposed thereon a layer of dielectric material 2 of complex dielectric constant $\epsilon_2^*$ and thickness $t_2$. A mudcake 3 has a complex dielectric constant of $\epsilon_3^*$ and a thickness $t_3$. A plane geometry model is used for the sake of simplicity. The rectangular coordinates are chosen so that the x axis coincides with the plane of the metal conductor. The problem is considered in two dimensions by assuming the device and the formation to be infinite in extent along the y dimension. An electromagnetic wave is considered as being launched into one end of the dielectric layer via a waveguide feed. The opposing end of the layer is terminated with tapered absorber 5, so that for all practical purposes the device can be assumed to be infinitely long in the x direction.

Solution for the electromagnetic field at regions of interest can be obtained by satisfying the boundary conditions at the various boundaries. Propagation constants in the different media can be determined with the aid of the fact that due to layering of dielectrics in the z direction, standing waves are produced. Hence the "resonant transmission line" procedure may be applied (see e.g. Weeks "Electromagnetic Theory For Engineering Applications", published by John Wiley & Sons, 1963, and "Field Theory of Guided Waves". Collins, McGraw Hill, 1960). The condition for resonance is that the admittance looking in the positive z direction is equal and opposite to the admittance looking in the negative z direction.

$$Y^+(z) + Y^-(z) = 0 \tag{1}$$

The electromagnetic wave can be considered as a superposition of TM waves (H field perpendicular to the conductor, the x-z plane) and TE waves (E field perpendicular to the x-z plane). The two cases can be treated separately. For the TM mode the ratio of the transverse H field to the transverse E field is the characteristic admittance of the medium. From transmission line theory, the admittance at the dielectric/mudcake interface (2, 3) is given by $$Y_{2,3}^+ = \frac{j\omega\epsilon_3^*}{\gamma_{z3}^*} \frac{\frac{j\omega\epsilon_4^*}{\gamma_{z4}^*} + \frac{j\omega\epsilon_3^*}{\gamma_{z3}^*} \tanh \gamma_{z3}^* t_3}{\frac{j\omega\epsilon_3^*}{\gamma_{z3}^*} + \frac{j\omega\epsilon_4^*}{\gamma_{z4}^*} \tanh \gamma_{z3}^* t_3} \tag{2}$$

$$Y_{2,3}^- = \frac{j\omega\epsilon_2^*}{\gamma_{z2}^*} \tanh \gamma_{z2}^* t_2 \tag{3}$$

$$(\gamma_n^*)^2 = \gamma_{zn}^{*2} + \gamma_{xn}^{*2} = \omega^2 \mu_o \epsilon_n^*, \ (n = 2, 3, 4) \tag{4}$$

$$\gamma_{x2}^* = \gamma_{x3}^* = \gamma_{x4}^* \tag{5}$$

Substituting (4) and (5) into (2) and (3) we have $$Y_{2,3}^+ = \frac{j\omega\epsilon_3^*}{(\omega^2\mu_o\epsilon_3 - \gamma_{x4}^*)^{\frac{1}{2}}} \tag{6}$$

-continued $$\frac{j\omega\epsilon_4^*}{(\omega^2\mu_o\epsilon_4^* - \gamma_{x4}^*)^{\frac{1}{2}}} + \frac{j\omega\epsilon_3^* \tanh(\omega^2\mu_o\epsilon_3^* - \gamma_{x4}^*)^{\frac{1}{2}} t_3}{(\omega^2\mu_o\epsilon_3^* - \gamma_{x4}^*)^{\frac{1}{2}}}$$

$$\frac{j\omega\epsilon_3^*}{(\omega^2\mu_o\epsilon_3^* - \gamma_{x4}^*)^{\frac{1}{2}}} + \frac{j\omega\epsilon_4^* \tanh(\omega^2\mu_o\epsilon_3^* - \gamma_{x4}^+)^{\frac{1}{2}} t_3}{(\omega^2\mu_o\epsilon_4^* - \gamma_{x4}^*)^{\frac{1}{2}}}$$

$$Y_{2,3}^- = \frac{j\omega\epsilon_2^*}{(\omega^2\mu_o\epsilon_2^* - \gamma_{x4}^*)^{\frac{1}{2}}} \tanh(\omega^2\mu_o\epsilon_2^* - \gamma_{x4}^*)^{\frac{1}{2}} t_2 \quad (7)$$

For the TE case the electric field is perpendicular to the incident plane. The characteristic impedance of the medium is the ratio of the transverse electric field to the transverse magnetic field and equal to $j\omega\mu/\gamma_z$. The transcendental equation for this case is of the same form as that for the TM mode provided $\epsilon$ and $\mu$ are interchanged. Solutions exist for only a certain range of dielectric constant layer thickness products. For the range of formation dielectric constants of interest, no TE solution of the desired type exists. In the TM mode, the electric field is predominantly perpendicular to the conductor surface, while in the TE mode it is parallel to the plane of the conductor.

The transcendental equations (6) and (7) are solved to obtain the propagation constants. One approach is to plot $Y_{23}^+$ vs $\gamma_{x4}^*$ graphically and $Y_{23}^-$ vs $\gamma_{x4}^*$ on the same scale. The roots are located at the intersection of the two curves. This approach is simple when dealing with lossless dielectrics. For lossy dielectrics, because of complex functions present the problem is two dimensional, and one has to deal with surfaces rather than curves. Solution of these transcendental equations shows that the electromagnetic wave propagating parallel to the dielectric layer surface will be identical in the layer material, in the mudcake, and in the formation. In addition, the magnitude of the propagation constant is a function of the dielectric properties of the unbounded medium, namely, the formation, provided there is some electromagnetic energy present in the unbounded medium. By selecting the operating frequency, one can in principle, choose the mudcake or the invaded zone or the virgin formation to be the unbounded medium. The lower the operating frequency, the deeper the depth of investigation. Since the invaded zone varies from a few inches to a few feet, the lower frequency range necessary to measure the dielectric properties of the virgin formation would be a few MHz. Similarly, to measure the properties of the region close to the borehole, the operating frequency would be in the microwave range. Also, since antenna dimensions generally depend on the operating frequency, different antennas will preferably be selected depending on the region of the formation of interest. Since the depth of investigation is roughly half the distance between transmitter-receiver spacing, the positions of the receivers with respect to the transmitter antennas should be chosen based on the desired depth of investigation.

With regard to the embodiment illustrated in FIGS. 6-9, the guiding layer of dielectric material is helpful in establishing wave energy in the formations (i.e., either the invaded zone or the virgin formation). Once the energy is in the formations, the mud and/or mudcake acts as a guiding medium to guide electromagnetic energy as it propagates toward the receivers. At the receivers, the guiding layers of dielectric material aid in more efficiently extracting the electromagnetic wave energy shed back from the formations into the borehole, consistent with the previously described theory.

The invention has been described with reference to particular embodiments, but variations within the spirit and scope of the invention will occur to those skilled in the art. For example, while individual transmitters are shown together with each receiver pair, it will be understood that the principles of the present invention can be utilized in conjunction with so-called "borehole compensated" techniques wherein alternately activated transmitters are employed on opposite sides of a receiver pair.

I claim:

1. A logging device for determining properties of formations surrounding a borehole, comprising;
   an elongated support with a wall-engagable member movable through the borehole;
   a transmitter and a pair of spaced receivers mounted in spaced relation in said member;
   a source of electromagnetic energy coupled to said transmitter;
   a layer of dielectric material disposed on a surface of said member and covering said transmitter and receivers and the region therebetween, such that said layer can abut the wall of said borehole;, said layer having a dielectric constant that is greater than the expected dielectric constant of surrounding formations to be investigated, said layer being operative to guide the electromagnetic energy travelling in the formations between the transmitter and the receivers; and
   means for measuring characteristics of electromagnetic energy received at said receiver to determine properties of the surrounding formations.

2. The device as defined in claim 1 wherein said layer of dielectric material has a thickness of at least about one-tenth of a wavelength of the electromagnetic energy in the dielectric material.

3. The device as defined by claim 1 wherein said transmitter is oriented so as to preferentially direct energy into said layer of dielectric material in the direction of said receiver.

4. The device as defined by claim 1 wherein said means for measuring characteristics of electromagnetic energy received at said receiver comprise means for determining the relative attenuation and relative phase of said electromagnetic energy.

5. The device as defined by claim 4 further comprising means for determining the dielectric constant of the formations from said measured characteristics of the electromagnetic energy.

6. The device as defined by claim 1 further comprising means for urging said supporting member against the wall of said borehole.

7. A method for measuring properties of subsurface formations surrounding an earth borehole, comprising the steps of:
   suspending a logging device in said borehole, the logging device having mounted in a surface thereof a transmitter element and a pair of spaced receivers spaced from the transmitter element;
   generating electromagnetic wave energy at the transmitter element of said device;
   inserting a dielectric guiding layer between said surface and the wall of the borehole, said dielectric guiding layer extending over said transmitter element and said pair of receivers, said dielectric guiding layer having a dielectric constant that is greater than the expected dielectric constant of surrounding formations to be investigated, and injecting electromagnetic energy into the formations via said guiding layer, whereby said electromagnetic energy is guided by said guiding layer in travelling in the formations toward said receivers;

receiving, at said receivers, via said dielectric guiding layer, electromagnetic energy that has passed through formations adjacent the borehole; and measuring characteristics of the received electromagnetic energy.

* * * * *